United States Patent Office 3,210,416
Patented Oct. 5, 1965

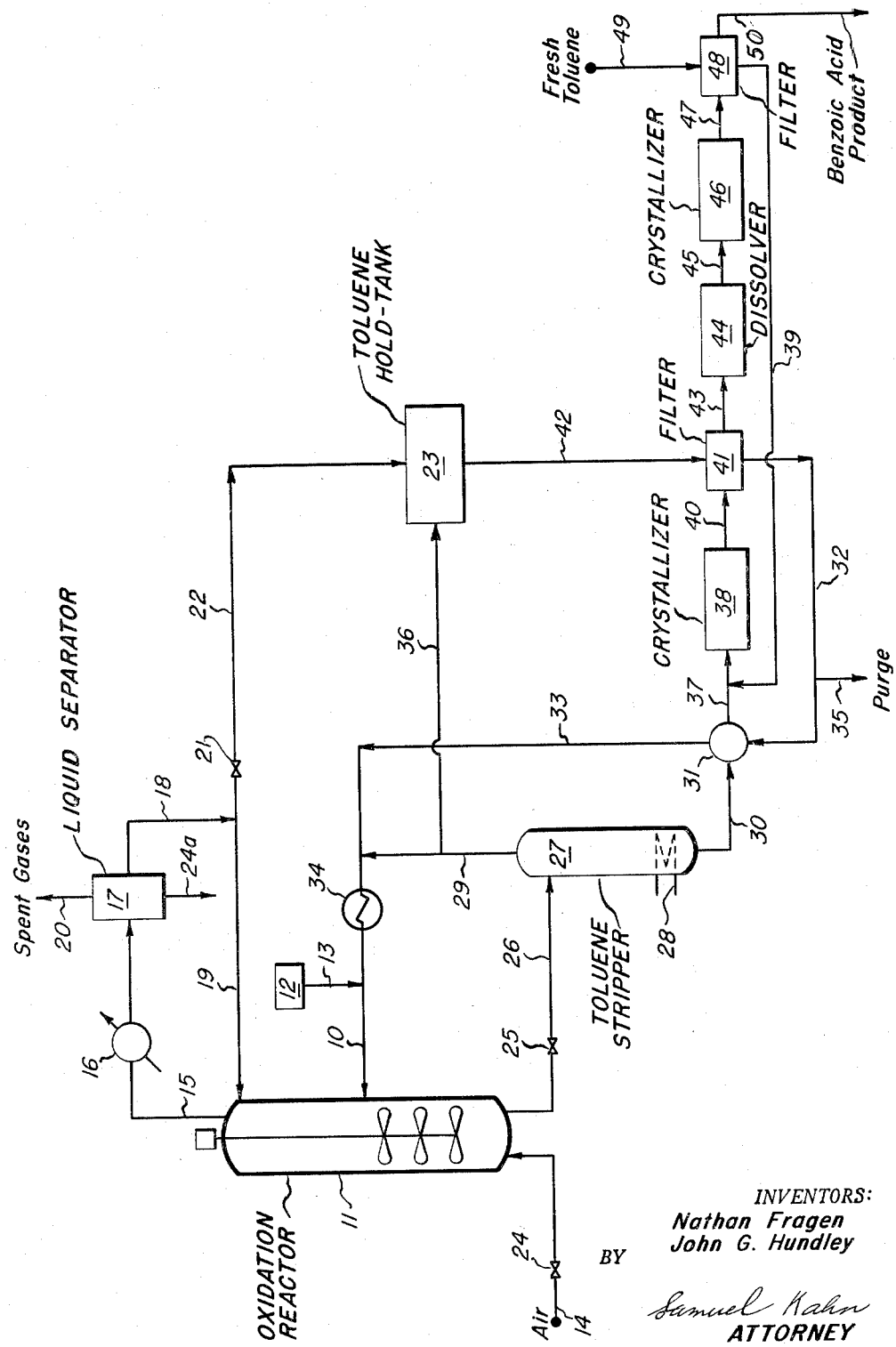

3,210,416
MANUFACTURE OF BENZOIC ACID FROM TOLUENE
Nathan Fragen, Hammond, and John G. Hundley, Munster, Ind., assignors to Standard Oil Company, Chicago, Ill., a corporation of Indiana
Filed Sept. 22, 1960, Ser. No. 57,709
6 Claims. (Cl. 260—524)

This invention relates to an improved process for the preparation of benzoic acid. More particularly, the invention is concerned with an integrated, continuous process for the conversion of toluene to benzoic acid by catalytic liquid phase air oxidation in the presence of metal oxidation catalysts, and with means for effecting recovery of high purity benzoic acid suitable for commercial applications.

Benzoic acid produced by the oxidation of toluene with an oxygen-containing gas in the presence of a heavy metal oxidation catalyst, for example cobalt or manganese salts, is normally contaminated with non-acidic oxygenated compounds which may be derived from impurities in the feedstock or may constitute the intermediate oxidation products or products of secondary reactions. Such non-acidic materials consist of tars and oxygenated materials such as benzaldehyde, benzyl alcohol, esters of benzoic acid and the like. Contaminants of this type in benzoic acid are highly undesirable since they cause the product generally to be unsuitable with respect to color, and when present in significant quantities, reduce the value of benzoic acid when employed for subsequent chemical conversion. Among such uses are the preparation of phenol, hydrogenation to hexahydrobenzoic acid, an intermediate for preparation of caprolactam, and preparation of various esters of value as plasticizers, solvent, etc.

The object of this invention is to provide an improved commercial oxidation system which is particularly suitable for the conversion of toluene to benzoic acid in such form that it may be readily recovered as a substantially pure product. A particular object is to provide a continuous oxidation system which will result in the attainment of product quality and yields comparable or even superior to those attainable in batch processes. A further object is to provide an integrated system for crystallizing and separating benzoic acid from a recycle stream comprising benzoic acid, toluene, catalyst and associated impurities most effectively. These and other objects will be apparent as the detailed description of the invention proceeds.

In practicing the invention, fresh toluene charging stock, together with recycle toluene containing dissolved benzoic acid as hereinafter more fully described, is introduced into the upper part of a continuous oxidation system into which is also introduced oxidation catalyst. The oxygen-containing gas is introduced into the countercurrent system at the opposite end from that at which charging stock is introduced. In some cases, it may be desirable to effect the countercurrent oxidation in a single vessel provided with a plurality of intermediate mixing stages. The heat of reaction is removed by boiling unreacted toluene and water (formed during the oxidation) from the vessel, condensing withdrawn vapors and returning the hydrocarbon condensate after separation of the water. The oxygen concentration in the withdrawn gasiform stream should not exceed about 5 to 8% in order to avoid possible explosion hazards; the countercurrent system is especially advantageous in that it enables practically quantitative oxygen utilization with minimum hazard and without substantial detriment to product yield or quality.

The oxidation of the toluene feedstock is effected in the presence of a heavy metal oxidation catalyst and advantageously in the presence of a catalyst consisting of a heavy metal oxidation catalyst and a bromine affording substance as a promoter. No novelty is claimed per se in the catalyst or in the catalyst promoter employed in this invention since the invention is an improvement in a toluene oxidation system recently perfected by others. The catalyst is a multivalent or heavy metal, preferably in a form which is soluble in the reaction medium or solvent. The catalyst metal may advantageously be selected from the group consisting of manganese, cobalt, nickel, chromium, vanadium, molybdenum, tungsten, tin, cerium or mixtures thereof, and the metal may be employed in elemental, combined or ionic form, preferably as a compound soluble in the reaction medium. The promoter, if used, is a bromine-affording substance, the bromine being in elemental, ionic or inorganic form. Thus, the bromine may be employed in the form of potassium bromate, ammonium bromide, benzyl bromide, tetrabromoethane, manganese bromide or the like. The proportions of catalyst and promoter may be approximately stoichiometric as exemplified by manganese bromide and generally are in the range of 1:10 to 10:1 atoms of catalyst metal per atom of bromine. The amount of catalyst employed is usually in the range of about .01 to 10% or more and is preferably in the range of about .2 to 2% by weight based on aromatic hydrocarbon reactant charged. The preferred mixed metal catalysts are mixtures of manganese in the form of bromide or acetate with ammonium molybdate, ammonium chromate, tungstic acid, cobalt acetate, or the like, the proportions usually being about 1 to 2 parts by weight of the manganese salt per part by weight of the other metal compound. Alternatively, of course, the catalyst metals may be employed as salts of an acid which is being produced in the system.

The oxidation reaction is effected continuously at an elevated temperature, e.g., in the range 250–450° F., preferably about 350–425° F., and elevated pressure sufficient to maintain liquid phase reaction conditions, e.g., 50–300 p.s.i., preferably about 200 p.s.i. It has been found that most desirable results, from the standpoint of achieving desired product quality, are obtained when the reactor is operated so as to obtain as an effluent stream a solution of about 20 weight percent benzoic acid in toluene, although somewhat broader ranges, e.g., 15–25% are also effective. The conversion of toluene to benzoic acid in an amount sufficient to yield a reactor effluent of such concentrations is readily accomplished by adjusting the rate of air (or other oxygen-containing gas) introduced to the reactor, as well as the residence time in the reactor. Generally, reaction is extremely rapid, particularly in the case where a bromine-affording substance is employed as a catalyst component, and a holding time in the reactor of the order of about 0.05 to 1 hour, e.g., 5 to 10 minutes is effective. It will be understood that oxygen is fed to the reactor at a rate which will permit rapid consumption of the gaseous oxygen, so as to avoid excessive oxygen content of the off-gases.

The oxidation product from the oxidation reaction is next introduced into a concentrator, which may be a flash chamber or other apparatus suitable for removal of toluene as an overhead stream. The flash chamber or stripper is operated at a temperature of about 300–325° F. and pressure between about atmospheric and 10 p.s.i.g., is employed to concentrate the reactor effluent to from about 40–60% by weight, approximately 50% benzoic acid. This concentration step is especially important to the process, since it has been found that subsequent recovery of benzoic acid by crystallization cannot be achieved economically at concentrations of the order of 10–20% benzoic acid. Thus, a 20% by weight solution of benzoic acid in toluene has a crystallization temperature of 116° F., and such a solution must be cooled to about 85° F. to precipitate 50% of the dissolved acid, whereas a 50% by weight solution of benzoic acid in toluene begins to precipitate the acid at 175° F. and half of the dissolved acid can be obtained by cooling to only 146° F. The latter temperature is much more readily obtainable in commercial operations. On the other hand, operation of the reactor in a manner which would produce an effluent of about 50 weight percent benzoic acid results in increased intermediate oxidation products and byproducts, poorer quality, and increased difficulty in controlling the concentration of $O_2$ in the reactor effluent gases so as to maintain the $O_2$ concentration within safely tolerated limits.

The benzoic acid enriched stream from the concentrator is next introduced to a heat exchanger, wherein the benzoic acid containing stream is indirectly contacted with the recycle mother liquor stream obtained from the subsequent filtration step. This heat exchange step offers added economies in process operation, as well as providing a recycle stream for introduction to the oxidation reactor which is at or near reaction temperature. It is essential that the recycle stream be hot in order to avoid quenching of the continuous oxidation reaction, which is characterized by a certain minimum initiation temperature.

The cooled benzoic acid stream is subsequently adjusted to a temperature between about 110° F. and about 130° F., preferably about 120° F. so as to precipitate a substantial quantity of the benzoic acid dissolved therein, and the precipitated acid separated by centrifugation, filtration or other liquid-solid separating means. All or a portion of the toluene recovered from the concentrator is employed as a wash liquor for washing the filter cake, and is recycled with mother liquor to the heat exchanger for subsequent recycle to the oxidation reactor.

When desired, the solid benzoic acid cake so obtained can be further purified by dissolving in fresh toluene and recrystallization therefrom at a temperature of about 130–140° F., preferably about 135° F. Mother liquor from the second crystallization is introduced to the first stage crystallizer for recovery and recycle of dissolved benzoic acid. Finally, the purified benzoic acid product is dried or alternatively melted, stripped of residual solvent, and flaked for bagging.

Further objects and aspects of the invention will be apparent from the following detailed description of a specific example thereof read in conjunction with the accompanying drawing which forms a part of the specification.

The invention will be described as applied to the conversion of about 3,500 pounds per hour of toluene charging stock to about 4,700 pounds per hour of benzoic acid. Recycle toluene charge (containing about 10.0% by weight of benzoic acid based on total charge) is introduced by line 10 to oxidizing vessel 11 at the rate of about 45,430 pounds per hour. The oxidation reactor 11 consists of a stirred and heated cylindrical vessel provided with air inlet at the bottom and overhead condensing means. Make-up catalyst consisting of an aqueous solution of manganese acetate and optionally ammonium bromide is introduced from vessel 12 through line 13 with charging stock. The rate of catalyst addition is adjusted so as to maintain a concentration of 0.5–1.0 weight percent manganese acetate and 0.2–0.5 weight percent ammonium bromide based on toluene in the reactor. Air is introduced through line 14 at the rate of about 2,000 standard cubic feet per minute. Inert gas and vapors are withdrawn from vessel 11 by line 15 through condenser 16 and separator 17, toluene condensate removed by line 18 being returned to the reactor by line 19 and vapor being withdrawn through line 20. Valve 21 is provided so as to divert overhead toluene condensate via line 22 to toluene hold tank 23, thus providing means for controlling the rate of toluene reflux to reactor 11. Water which separates from overhead condensate is discharged from receiver 17 via line 24a. The gas phase in 16, 17, and 20 should contain less than 8% oxygen and control valve 24 is regulated to prevent oxygen concentration from exceeding this limit (preferably zero).

In this particular example, vessel 11 is operated at about 200 p.s.i.g. and 285° F., the holding time in the vessel being about 2 to 5 minutes. Effluent from the reactor, consisting of a solution of about 20% benzoic acid in toluene, together with dissolved catalyst, is withdrawn at a rate of about 0.35 volume per minute per volume of liquid reactant through pressure reducing valve 25 and introduced via line 26 to toluene stripper 27. Vessel 27 consists of a flash still provided with auxiliary heating means, e.g. steam coil 28, and is operated at a bottom temperature of about 310° F. Toluene is flashed off in the stripper, vapors being removed via line 29 and a concentrated solution of benzoic acid in toluene containing about 50 weight percent benzoic acid being withdrawn as bottom therefrom via line 30. In the particular example, approximately 10,125 pounds of benzoic acid and an equal amount of toluene is withdrawn through line 30 each hour.

The benzoic acid concentrate passes via line 30 to indirect heat exchanger 31 wherein it is contacted with recycle mother liquors obtained from the subsequent crystallization, introduced to heat exchanger 31 via line 32. The mother liquor recycle stream, consisting of 4,755 pounds/hour of benzoic acid and 17,115 pounds/hour of toluene, is introduced to the heat exchanger at about 120° C. and emerges via line 33 at a temperature of about 150° F. Additional heat may be provided by passage of recycle liquor through preheater 34 and mother liquors then recycle to the reactor 11 via line 10. Purge line 35 is provided for continuous removal of a portion of mother liquor from separation 38 to prevent buildup of undesirable impurities.

Referring back to vessel 27, a portion of the overhead toluene condensate is recycled via line 10 to the reactor, after first being brought to reaction temperature in preheater 34. In this example, toluene is removed from the stripper in an amount of 30,630 pounds per hour, and 23,640 pounds is recycled to reactor 11, while 7,000 pounds are directed via valved line 36 to toluene holding tank 23.

Returning to heat exchanger 31, benzoic acid concentrate passes via line 37 to crystallizer 38 wherein it is cooled to a temperature of about 120° F. Where a second crystallization stage is employed for purification of benzoic acid, as shown in the figure, recycle mother liquors from the second crystallization are introduced to crystallizer 38 via line 39. In the present example, a second mother liquor recycle stream consisting of 3,930 pounds per hour of benzoic acid together with 9,870 pounds per hour of toluene enters the crystallizer 38, together with the benzoic acid concentrate from heat exchanger 31. Operation of the crystallizer 38 at 120° F. results in formation of a benzoic acid slurry which is pumped via line 40 to filtering means 41. Filtering means 41 may be a continuous centrifuge or rotary filter provided with means for introducing wash toluene from toluene holding tank 23, as by line 42. The filter cake which is separated is continuously discharged via line 43 to dissolver 44, the filtrate from 41 being recycled as hereinbefore described to heat exchanger 31 for recycle to the oxidation reactor.

In a preferred embodiment of the invention, benzoic acid filter cake, obtained in this example in an amount of 9,300 pounds per hour together with toluene (2,880 lbs. per hour) which adheres to the cake is redissolved in vessel 44 by heating in contact with 6,990 pounds per hour of toluene introduced from toluene holding tank 23 by line not shown. Solution is effected at a temperature of about 170° F., the solution then passing through line 45 to second crystallizer 46 wherein a slurry of benzoic acid is formed by cooling to about 136° F. In practicing the invention, it is important to operate the second crystallizer at a temperature above about 130° F. and preferably from 10–25° F. higher than the temperature in first crystallizer 38. Operation in this manner insures high purity of final benzoic acid product and obviates the necessity for further crystallization or distillation steps.

Solids precipitated in crystallizer 46 are pumped as a slurry via line 47 to filtration means 48 which is preferably a continuous rotary filter similar to 41. Filter cake is washed with fresh toluene, introduced via line 49 from source not shown, which serves as makeup for the continuous oxidation system; mother liquors from the second filtration being recycled to first crystallizer 38 as hereinbefore described. Solid benzoic acid filter cake is continuously removed from filter 48 via line 50 in an amount of 5,340 pounds per hour and containing 910 pounds of toluene, which can be removed by vacuum drying of the product. Alternatively, means can be provided for melting the benzoic acid product and stripping residual toluene therefrom, e.g. by vacuum or countercurrent steaming. Final product is passed to a flaker or other means for yielding solid benzoic acid product as a dry, pure cake of over 99% purity.

From the foregoing example, it will be seen that an effective integrated continuous process has been provided for the oxidation of toluene to benzoic acid and for the recovery of high purity benzoic acid as a reaction product. Alternative operating techniques, steps and conditions will be apparent from the foregoing description to those skilled in the art.

We claim:

1. A continuous process for the production of benzoic acid from toluene which comprises contacting a mixture of toluene, benzoic acid and heavy metal oxidation catalyst in the liquid phase with a gas containing free oxygen in an oxidation zone at a temperature between about 250° F. and about 450° F. and a pressure between about 50 and about 300 p.s.i. until the benzoic acid content of the mixture is between about 15 and about 25% by weight, thereafter continuously removing reaction mixture from the oxidation zone, distilling said reaction mixture at 300 to 325° F. and 0 to 10 p.s.i.g. pressure to remove toluene and obtain a concentrate containing from about 40% to about 60% by weight benzoic acid, cooling said concentrate to a temperature of about 120° F. separating solid benzoic acid from a liquid mother liquor stream, contacting said mother liquor stream by indirect heat exchange with said benzoic acid concentrate whereas said mother liquor is heated to a temperature above 120° F. and said concentrate is cooled below 300° F. and recycling said mother liquor stream to the oxidation zone.

2. The process of claim 1 wherein said benzoic acid concentrate is obtained by flash distillation of toluene from the oxidation zone effluent.

3. The process of claim 2 wherein the solid benzoic acid is washed with toluene obtained by said flash distillation and said wash liquid is recycled with said mother liquor stream to the oxidation zone.

4. In a continuous process of producing benzoic acid wherein toluene is oxidized in an oxidation zone in the presence of benzoic acid at a temperature in the range of 250 to 450° F. and a pressure in the range of 50 to 300 p.s.i.g. with an oxygen-containing gas in the presence of a heavy metal oxidation catalyst to obtain a reaction mixture having 15 to 25% by weight benzoic acid and withdrawing said reaction mixture for recovery of benzoic acid by crystallization at a temperature below said 250 to 450° F. temperature range, the improvement of withdrawing from said zone a liquid effluent comprising in the range of about 15 to about 25% benzoic acid, distilling said effluent at a temperature in the range of 300 to 325° F. and a pressure in the range of 0 to 10 p.s.i.g. to produce an overhead fraction comprising predominantly toluene and as a bottoms fraction a concentrate comprising in the range of about 40 to about 60 weight percent benzoic acid, charging at least a part of said overhead fraction to said oxidation zone, cooling said concentrate by indirect heat exchange to a temperature below said 300 to 325° F. and at a pressure in the range of 0 to 10 p.s.i.g. with a hereinafter defined mother liquor stream at a temperature in the range of 110 to 130° F., crystallizing benzoic acid from the cooled concentrate at a temperature in the range of 110 to 130° F., separating therefrom at 110 to 130° F. benzoic acid crystals and toluene rich-mother liquor containing dissolved benzoic acid, and charging said mother liquor heated to a temperature about 110 to 130° F., after indirect heat exchange as aforesaid, to said zone.

5. The process of claim 4 wherein said benzoic acid crystals are dissolved in the remaining portion of said overhead fraction to provide a solution of about 50 weight percent benzoic acid, and thereafter crystallizing and separating benzoic acid crystals from said solution.

6. The process of claim 5 wherein the first crystallization is conducted at a temperature of about 120° F. and the second crystallization is conducted at a temperature in the range of about 130 to about 145° F.

References Cited by the Examiner

UNITED STATES PATENTS

| | | | |
|---|---|---|---|
| 1,685,634 | 9/28 | Jaeger | 260—525 |
| 1,919,023 | 7/33 | Jaeger | 260—525 |
| 1,987,552 | 1/35 | Fauser | 23—274 XR |
| 2,696,499 | 12/54 | Himel | 260—524 |
| 2,712,549 | 7/55 | Cheney | 260—525 XR |
| 2,712,550 | 7/55 | Cheney et al. | 260—525 XR |
| 2,712,551 | 7/55 | Himel et al. | 260—525 XR |
| 2,771,488 | 11/56 | Sello | 260—525 |
| 2,788,367 | 4/57 | Bills et al. | 260—525 XR |
| 2,833,816 | 5/58 | Saffer et al. | 260—524 |
| 2,962,361 | 11/60 | Spiller et al. | 260—524 XR |
| 2,963,509 | 12/60 | Barker et al. | 260—524 |

FOREIGN PATENTS 833,440    4/60    Great Britain.

LORRAINE A. WEINBERGER, Primary Examiner.

LEON ZITVER, Examiner.